US006714922B1

(12) United States Patent
Sansone et al.

(10) Patent No.: US 6,714,922 B1
(45) Date of Patent: Mar. 30, 2004

(54) METHOD FOR RETURNING MERCHANDISE

(75) Inventors: Ronald P. Sansone, Weston, CT (US);
Ian A. Siveyer, Monroe, CT (US);
Ahjaz A. Sethi, West Haven, CT (US);
Robert A. Law, Ridgefield, CT (US);
Susan Garvey, Fairfield, CT (US);
Brian J. Moughty, Darien, CT (US)

(73) Assignee: Pitney Bowes Inc., Stamford, CT (US)

( * ) Notice: Subject to any disclaimer, the term of this patent is extended or adjusted under 35 U.S.C. 154(b) by 278 days.

(21) Appl. No.: 09/722,812

(22) Filed: Nov. 27, 2000

(51) Int. Cl.⁷ ............................................... G06F 17/60
(52) U.S. Cl. ...................... 705/406; 705/408; 705/410; 705/404
(58) Field of Search ..................... 705/400, 401, 705/402, 406, 408, 410, 26

(56) References Cited

U.S. PATENT DOCUMENTS

| | | | |
|---|---|---|---|
| 4,839,505 A | 6/1989 | Bradt et al. | 235/381 |
| 4,866,661 A | 9/1989 | de Prins | 364/900 |
| 4,887,208 A | 12/1989 | Schneider et al. | 364/403 |
| 5,111,030 A | 5/1992 | Brasington et al. | 235/375 |
| 5,468,110 A | 11/1995 | McDonald et al. | 414/273 |
| 5,659,163 A | 8/1997 | Lagan et al. | 235/375 |
| 5,726,894 A * | 3/1998 | Sansone | 705/408 |
| 5,844,221 A | 12/1998 | Madigan et al. | 235/383 |
| 5,893,512 A * | 4/1999 | Diedrich | 229/300 |
| 6,175,825 B1 * | 1/2001 | Fruechtel | 705/410 |
| 2002/0032612 A1 * | 3/2001 | Williams et al. | 705/26 |
| 2002/0010689 A1 * | 5/2001 | Tibbs et al. | 705/408 |
| 2001/0018660 A1 | 8/2001 | Sehr | |
| 2001/0044785 A1 | 11/2001 | Stolfo et al. | |
| 2002/0010708 A1 | 1/2002 | McIntosh | |
| 2002/0019785 A1 | 2/2002 | Whitman | |
| 2002/0032613 A1 | 3/2002 | Buettgenbach et al. | |
| 2002/0083013 A1 | 6/2002 | Rollins et al. | |

FOREIGN PATENT DOCUMENTS

| | | | |
|---|---|---|---|
| JP | 2001-266032 A | * | 9/2001 |
| WO | WO 00/29995 | | 5/2000 |
| WO | Wo 01/31593 A1 | * | 5/2001 |

OTHER PUBLICATIONS

Walsh, Etta et al., Parcel carriers are helping e-tailers handle returns, Nov. 2000, Logistics Management & Distribution Report, vol. 39, Issue 11, p. 24, 2p.*

Rosencrance, Linda, UPS Service Aims to Ease Online Returns., Sep. 25, 2000 Computerworld, vol. 34 Issue 39, p. 10, 1/2 p.*

Unknown author, Returns Online and USPS Form Alliance, Apr. 2001, Direct Marketing, vol. 63 Issue 12, p. 17, 1/2 p.*

* cited by examiner

Primary Examiner—Thomas A. Dixon
Assistant Examiner—Richard Woo
(74) Attorney, Agent, or Firm—Ronald Reichman; Angelo N. Chaclas

(57) ABSTRACT

Merchandise Return Label may be printed on a buyer's computer printer and paid for by the seller's postage meter. Goods mailed with the Merchandise Return Label will be considered metered mail. Returned goods may be delivered directly to the buyer, and postal employees will not have to manually complete the Merchandise Return Label. Since the mailing of the returned goods was paid for by a postage meter, the Post Office would not have to receive payment from the seller when the seller receives the package.

13 Claims, 9 Drawing Sheets

METHOD FOR RETURNING MERCHANDISE

CROSS REFERENCE TO RELATED APPLICATIONS

Reference is made to commonly assigned copending patent application Ser. No. 09/723,021 filed herewith entitled "Verifiable Carrier Payment Method For Returning Merchandise" in the name of Ronald P. Sansone.

FIELD OF THE INVENTION

This invention pertains to commercial transactions and, more particularly, to the return of delivered merchandise.

BACKGROUND OF THE INVENTION

In the past, buyers of goods typically went from store to store to determine which goods they wanted to purchase. Buyers of clothing had an opportunity to try on the clothing and determine how the clothing looked on them. The buyers were also able to observe: the type of fabric used to manufacture the clothing, the color of the fabric; and the quality of the clothing. When buyers purchased electronic goods, i.e., television sets, radios, clocks, computer, computer peripherals, digital cameras, stereos, etc., the buyer had an opportunity to observe the performance of the electronic goods. Buyers of books had an opportunity to read passages from books. Buyers of furniture had an opportunity to sit in a chair and determine how comfortable the chair was. The buyer could also examine the chair and determine the type of wood that was used to manufacture the chair and the quality of the chair. Thus, buyers of merchandise sold in stores had an opportunity to view and examine the goods that were offered for sale before they purchased the goods. Hence, the buyers knew what they were buying before they purchased the goods.

Many goods are currently being offered for sale from a catalog or over the internet. The perspective buyer of goods offered for sale from a catalog or the internet may have an opportunity to view an image of the goods offered for sale on a printed page and/or a display screen, The prospective buyer would not have an opportunity to view and examine the goods before purchasing the goods. Consequently, the buyer may be of the opinion that purchased clothing was manufactured from the wrong fabric, is of the wrong color and of poor quality. Buyers of electronic goods often felt the equipment did not function in the manner they expected. Buyers of books and furniture also were of the opinion that the purchased books and/or furniture did not meet their expectations. Thus, the buyers of goods from catalogs or over the internet often wanted to return the purchased goods to the seller and receive their money back.

Typically, the buyer would telephone the seller and inform the seller that the buyer would like to return some or all of the purchased goods. The seller may send the buyer a Merchandise Return Label; tell the buyer to pack the goods that they want to return in the package in which the goods were sent; and, affix the aforementioned label to the package. The buyer would have to write the buyer's address on the label.

Current United States Postal Service Regulations regarding Merchandise Return Labels consider that goods mailed with the foregoing labels are "permit mail". Permit mail having the above labels will not be delivered directly to the seller, but will be delivered to the United States post office that issued the permit number. Thus, the seller will be inconvenienced by having to pick up the package containing the returned goods at the post office that issued the permit number. When the package containing the returned goods arrives at the post office, a postal employee will have to manually weigh the package; determine the postage that is due; complete the Merchandise Return Label and receive payment from the permit holder when the permit holder receives the package. The above process is expensive, time-consuming and labor-intensive.

SUMMARY OF THE INVENTION

This invention overcomes the disadvantages of the prior art by providing a new type of Merchandise Return Label that may be printed on a buyer's computer printer and paid for by the seller's postage meter. Goods mailed with the new type of Merchandise Return Label will be considered "metered mail". Returned goods may be delivered directly to the buyer, and postal employees will not have to manually complete the new type of Merchandise Return Label. Since the mailing of the returned goods was paid for by a postage meter, the post office would not have to receive payment from the seller when the seller receives the package.

This invention accomplishes the foregoing by having the seller or shipper of the goods place a label or impression on every package, flat or mail piece that may be delivered with an indicia that is affixed thereto. The package, flat or mail piece (hereinafter "container") may be delivered by the post office, a courier, or private delivery service, i.e., Federal Express®, United Parcel Service®, DHL®, Emory®, Airborne,®, etc. The label or impression may include the meter number that paid for the delivery of the container, the serial number of the indicia, as well as the weight of the shipped container. Information contained in the label or impression or information stored in the meter will be sent by the meter that paid for the shipment of the container to a data center. If the buyer of the shipped container decides to return the goods in the container to the seller, the buyer may notify the seller or the data center by telephone, facsimile, post, or the internet, of their intention to return the goods. The seller or the data center may send the buyer information to complete the new Merchandise Return Label (if the label was contained in the container) by telephone, facsimile, post, or the internet, or send the buyer a completed Merchandise Return Label by facsimile, post, or the internet. The seller's or shipper's meter will be debited for the cost of returning the container. The buyer will enter the information provided by the data center on the new Merchandise Return Label (if the label was contained in the container) and affix the completed label to the container or affix a new label that has been supplied by the data center to the container. Then the buyer will deposit the container containing the returned goods with the post, a courier, or private delivery service so that the go, courier, or private delivery service the amount debit to the meter for the cost of returning the container. The data center may deduct a service charge or fee for its services in completing the above.

DETAILED DESCRIPTION OF THE PREFERRED EMBODIMENT

Figure 1:
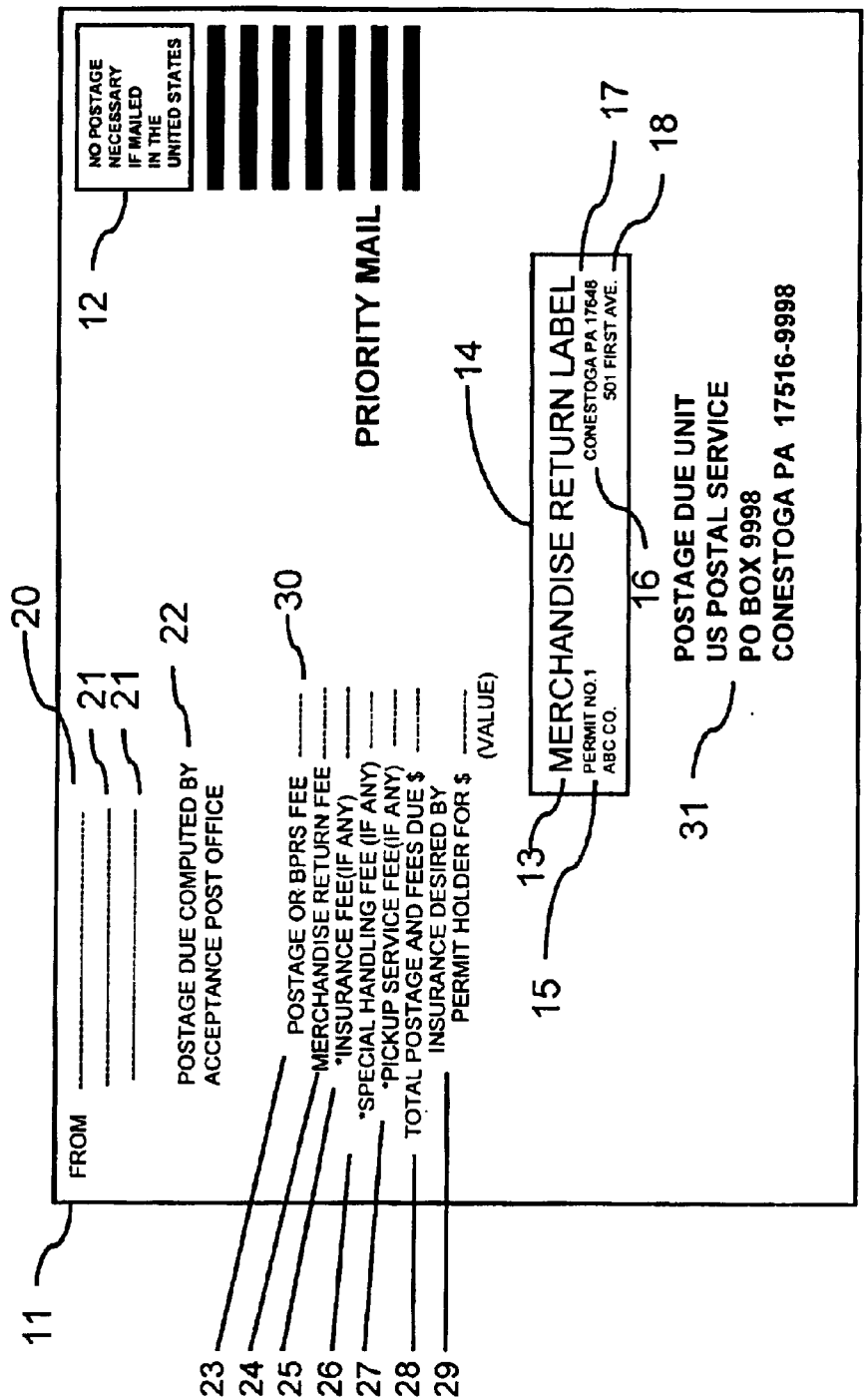
FIG. 1 is a drawing of a prior art Merchandise Return Label.

Referring now to the drawings in detail, and more particularly to FIG. 1, the reference character 11 represents a Merchandise Return Label. The endorsement 12 "No Postage Necessary If mailed in the United States" is printed in the upper right corner of label 11. The expression 13 "Merchandise Return Label" is contained in rectangle 14. The permit number 15 of the sender of label 11, the name 16 and location 17 of the post office that issued permit number 15, and the permit holder's name and address 18 are also contained in rectangle 14. The name of the buyer returning the goods will be printed in space 20, and the address of the buyer returning the goods will be printed in space 21. The expression 22 "Postage Due Computed By Acceptance Post Office" is printed below space 21. The special service endorsements: postage 23; merchandise return fee 24; delivery insurance fee 25, special handling fee 26; pickup service fee 27; total postage and fees due 28; and insurance desired 29 by permit holder for and spaces 30, are printed on label 11. The name and address 31 of the Postage Due Unit of the permit holder will be printed below rectangle 14. Personnel from the Postage Due Unit will weigh the container (not shown) that label 11 is affixed to and enter the applicable fees in spaces 30. The entering of fees into spaces 30 is labor intensive and consequently costs the Post a great deal of money Additionally, the container will be held at the Postage Due Unit until the permit holder physically pays for the postage and accepts the container.

Figure 2:
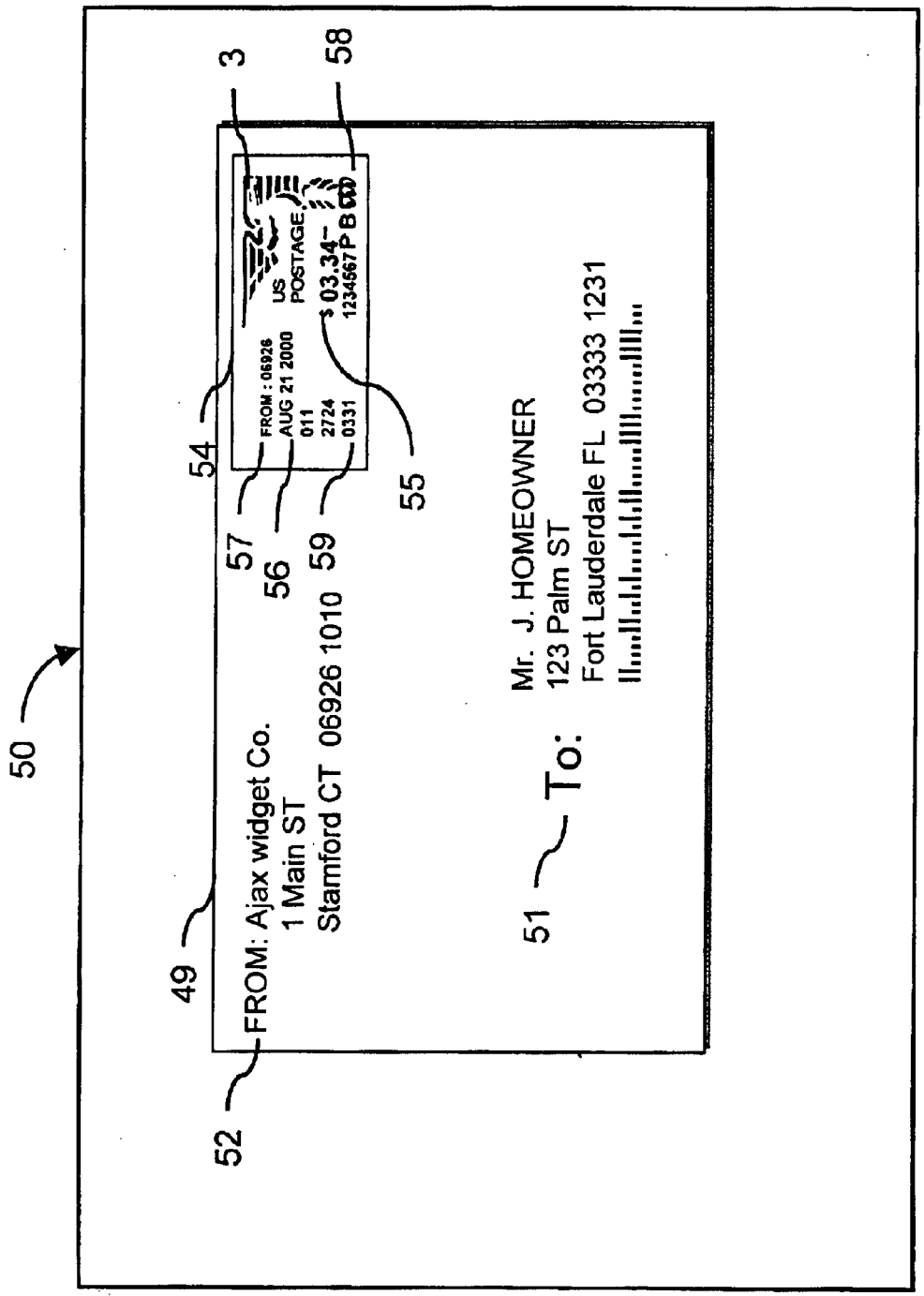
FIG. 2 is a drawing of a label 49 affixed to a container 50 that is sent to a buyer by a seller of goods.

FIG. 2 is a drawing of a label 49 affixed to a container 50 that is sent to a buyer by a seller of goods. It will be obvious to one skilled in the art that the information in label 49 may be printed directly on container 50. Label 49 has a buyer or recipient address field 51 and a seller or sender address field 52. A postal indicia 54 is affixed to label 49. Indicia 54 contains a dollar amount 55; the date 56 that postal indicia 54 was affixed to label 49; the place 57 that mail piece 10 was mailed; the postal meter serial number 58; an eagle or other graphic representation 3; and a security code 59. The combination of date 56, meter serial number 58 and security code 59 produce a unique number. It would be obvious to one skilled in the art that indicia 54 may be an information-based indicia or other type of indicia (if required) recognized by the carrier.

Figure 3A:
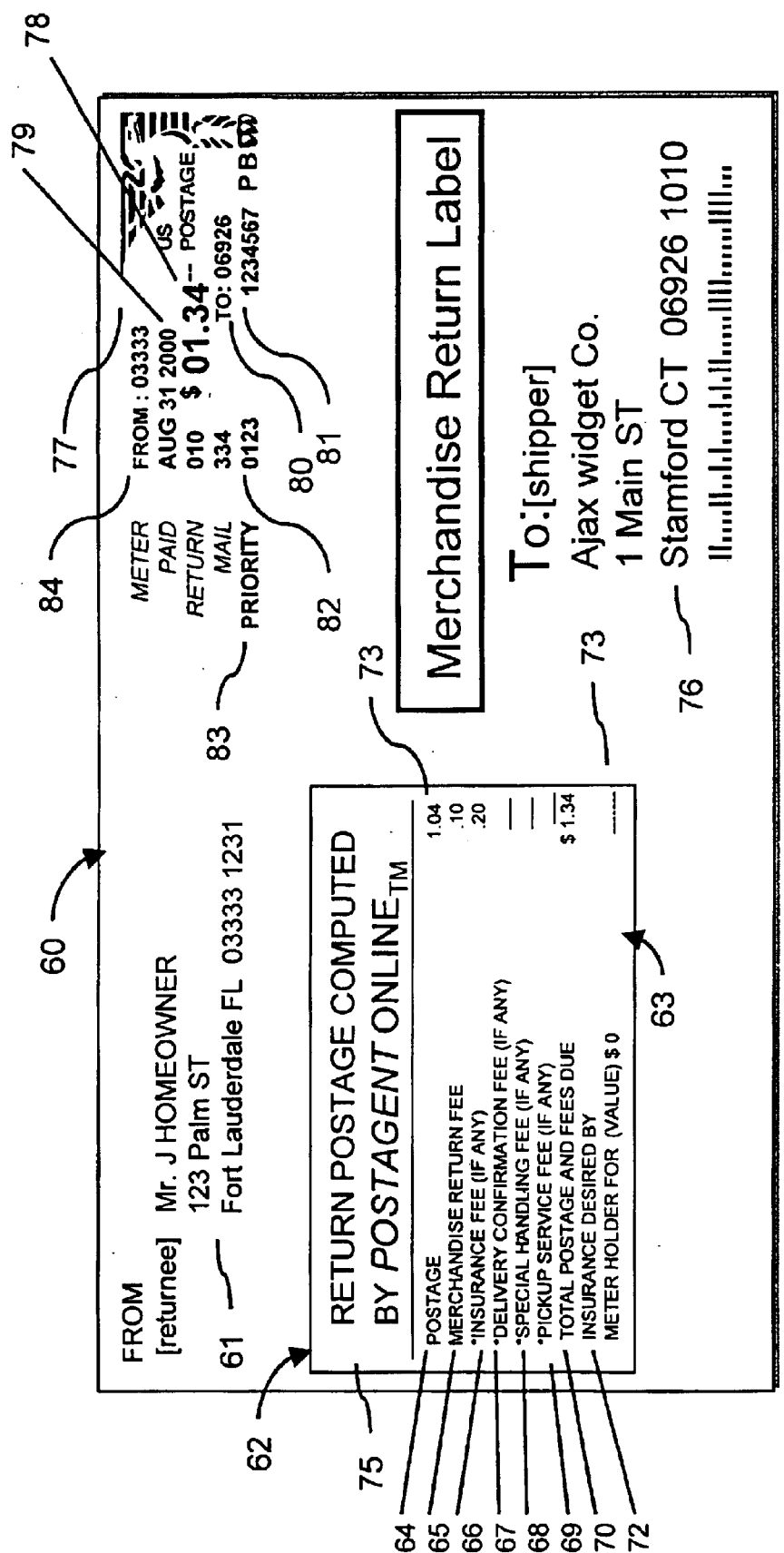
FIG. 3A is a drawing of a new Merchandise Return Label 60 that has a replica of a indicia affixed thereto.
Figure 4:
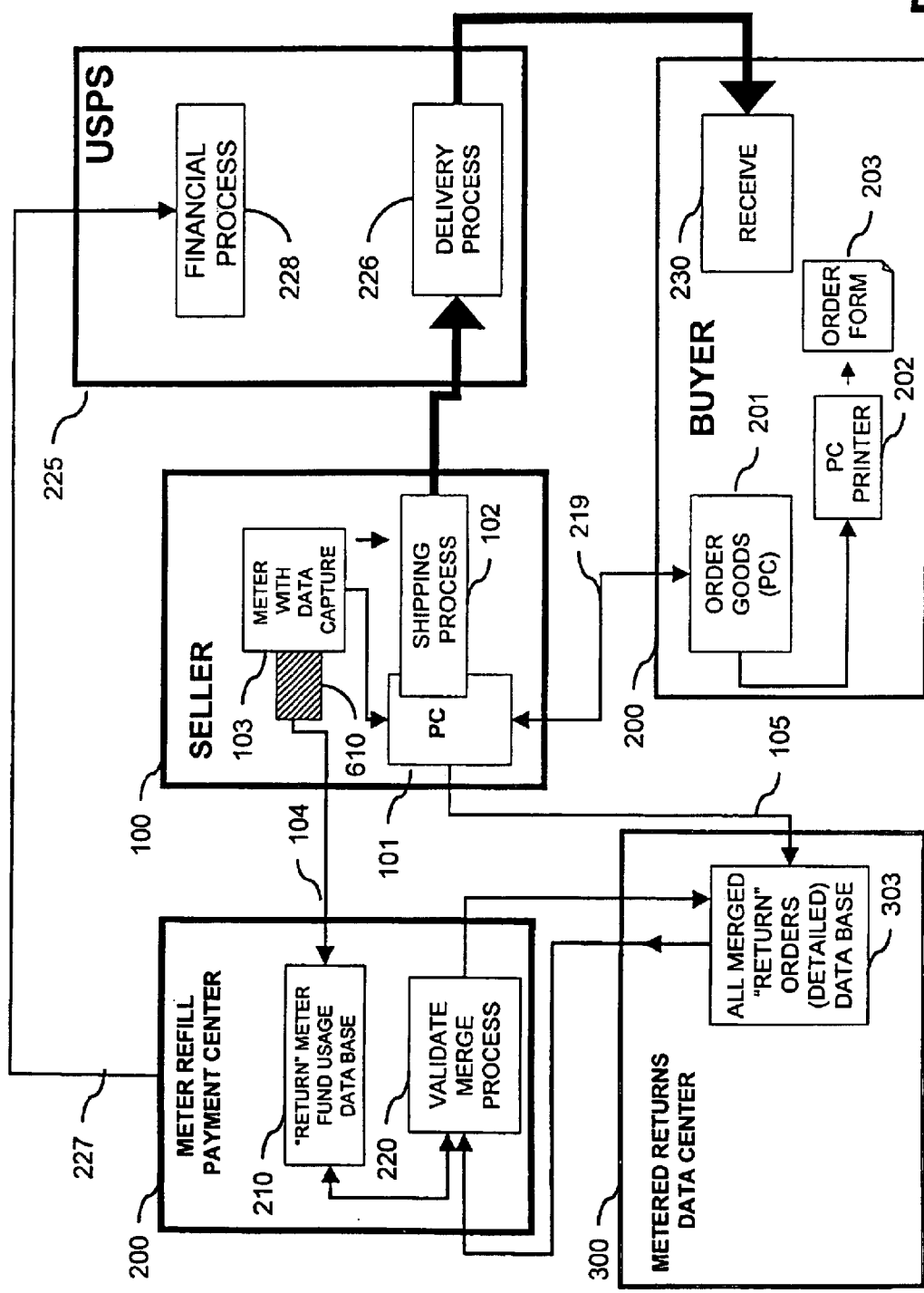
FIG. 4 is a drawing showing the manner in which goods are ordered.

FIG. 3A is a drawing of a new Merchandise Return Label 60 that has a replica of an indicia that is attached thereto. The postage for printing label 60 is charged to an account associated with meter 103 (FIG. 4). Label 60 was printed by printer 202 (FIG. 4). The buyer's name and address 61, or the name and address of the person who is returning the goods, are printed in the upper left corner of label 60. The name of the entity that computed the postage 75 that is due to deliver the goods that label 60 is affixed to is contained in rectangle 62. The charges consisting of: amount of postage 64 to deliver the goods that label 60 is affixed to; merchandise return fee 65; insurance fee 66; delivery confirmation fee 67; special handling fee 68; pick up service fee 69; total postage and fees due 70; insurance desired by meter holder 72 for (value) $0 are all contained in rectangle 63. Spaces 73 are used by the entity that computed the postage 75 for entering: the amount of postage 64; the merchandise return fee 65; the insurance fee 66; the delivery confirmation fee 67; the special handling fee 68; the pick up service fee 69; the total postage and fees due 70; the insurance desired by meter holder 72. The name and address 76 of the seller or person to whom the goods are being shipped appears in the bottom right of label 60. The postal indicia 77 contains a dollar amount 78 for the total postage and fees due; the date 79 that the postal indicia was affixed to label 60; the zip code 80 of the seller who is receiving the returned goods that label 60 is affixed to; the zip code 84 of the buyer who is returning the goods the postal meter serial number 81; and a security code 82. The class of mail 83 that label 60 is going to be affixed to appears in the right corner of label 60.

Figure 3B:
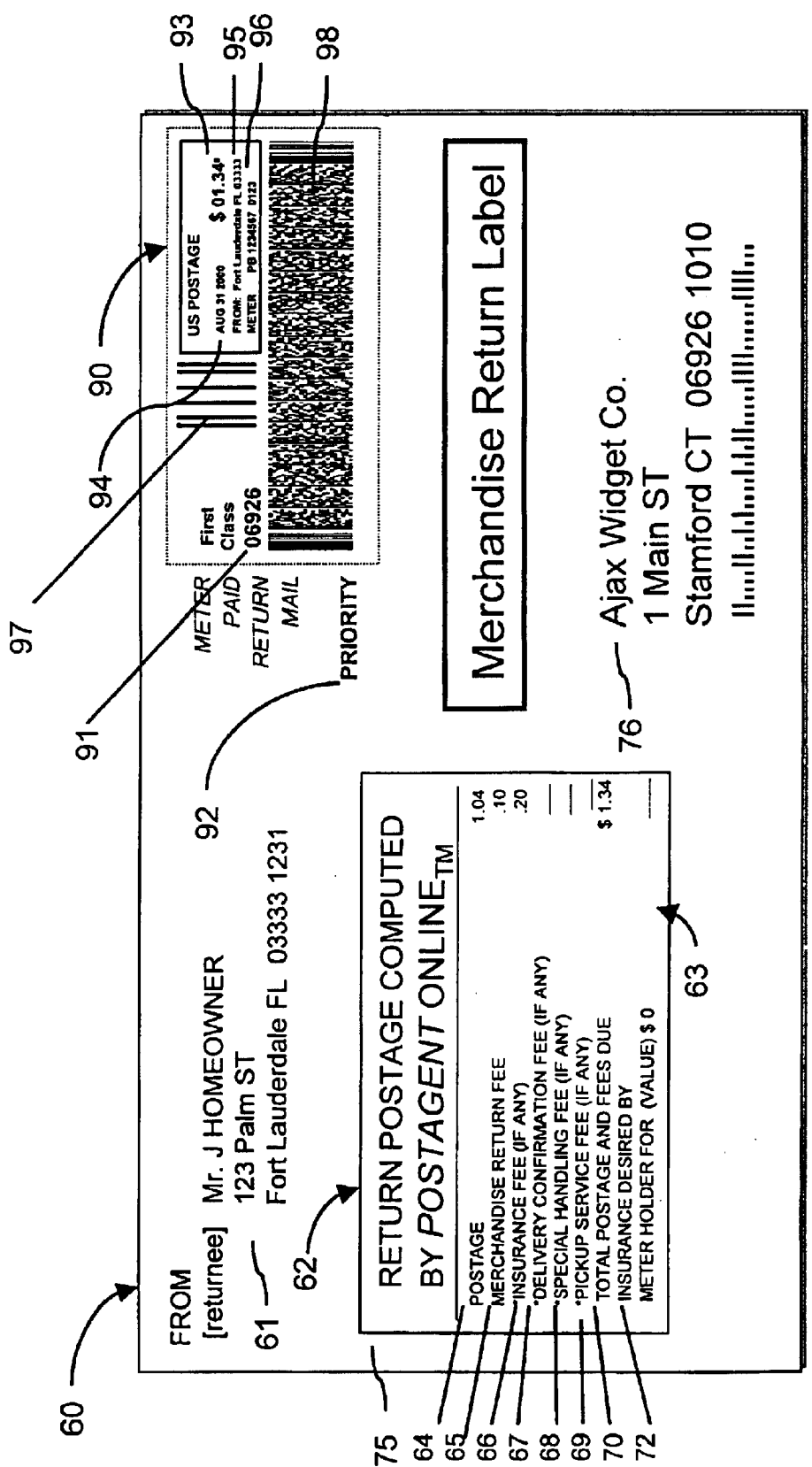
FIG. 3B is a drawing of a new Merchandise Return Label 60 that has a information based indicia affixed thereto.

FIG. 3B is a drawing of a new Merchandise Return Label 60 that has an information-based indicia 90 affixed thereto. Label 60 was printed by printer 202 (FIG. 5), and the postage for printing label 60 was charged to an account associated with meter 103. The buyer's name and address 61 or the name and address of the person who is returning the goods are printed in the upper right corner of label 60. The name of the entity that computed the postage 75 that is due to deliver the goods that label 60 is affixed to is contained in rectangle 62. The charges including: amount of postage 64 to deliver the goods that label 60 is affixed to; merchandise return fee 65; insurance fee 66; delivery confirmation fee 67; special handling fee 68; pick up service fee 69; total postage and fees due 70; insurance desired by meter holder 72 for (value) $0 are contained in rectangle 63. Spaces 73 are used by the entity that computed the postage 75 for entering: the amount of postage 64; the merchandise return fee 65; the insurance fee 66; the delivery confirmation fee 67; the special handling fee 68; the pick up service fee 69; the total postage and fees due 70; the insurance desired by meter holder 72. The name and address 76 of the seller or person to whom the goods are being shipped appear in the bottom right of label 60. The indicia 90 contains: a dollar amount 93 for the total postage and fees due; the date 94 that indicia 90 was generated; the place 95 of the computer that printed indicia 90; the postal security device serial number 96 or virtual meter number; a FIM code 97; a two-dimensional, encrypted bar code 98; the zip code 91 of the seller who is returning the goods that label 60 is affixed to; and the class of mail 92 to which label 60 is going to be affixed.

FIG. 4 is a drawing showing the manner in which goods are ordered. Seller 100 receives an inquiry from buyer 200 regarding the sale of specified goods. The inquiry may be between seller's personal computer 101 and buyer's personal computer 201 via communications link 219, i.e., the world wide web. After seller 100 and buyer 200 agree upon the terms and conditions of sale and return of the specified goods, the goods may be paid for with a credit card, and computer 101 causes computer 201 to enable printer 202 to print order confirmation 203. The goods are packed into a container, and shipping process 102 determines the information needed to complete label 49 (FIG. 2) as well as some additional information. Process 102 will determine the name and address of the seller/sender and buyer/recipient, a description of each item packed in container 50 (FIG. 2), the weight of each item packed, the amount of postage in dollars, and the information contained in indicia 54.

Computer 101 will upload the foregoing information determined by process 102 to all return orders detailed data base 303 via communication link 105. Database 303 is contained in meter returns data center 300. Meter with return data capture 103 is coupled to computer 101. An example of a meter having data capture is described in U.S. Pat. No. 5,111,030 entitled "Postal Charge Accounting System" herein incorporated by reference. Switch 610 enables meter 103 to perform data capture, i.e., prepare the information contained in rectangle 62 (FIGS. 3A and 3B), and to produce zip code 91, class of mail 92, unique number 252 and bar code 253 (FIG. 3B). Meter 103 will print indicia 54 on label 49 (FIG. 2). Periodically, the data captured by meter 103 is uploaded to return usage data base 210 via communications link 104. Data base 210 is coupled to process 220. Periodically, validation process 220 will initiate an exchange of information between data base 303 and process 220 to assure that each metered label 49 has an associated data field in data base 303. The foregoing validates the data in data base 210 with data base 303. If the information in data base 210 is not the same as the information in data base 303, meter refill and payment center 200 will request that carrier 225 supply the missing data. Shipping process 102 will also deposit container 50 with carrier 225. Carrier 225 may be the United States Postal Service. Postal delivery process 226 will deliver container 50 to buyer 200 receive location 230. Center 200 will transmit information and payments regarding indicia 54 to financial process 228 via communication link 227.

Figure 5:
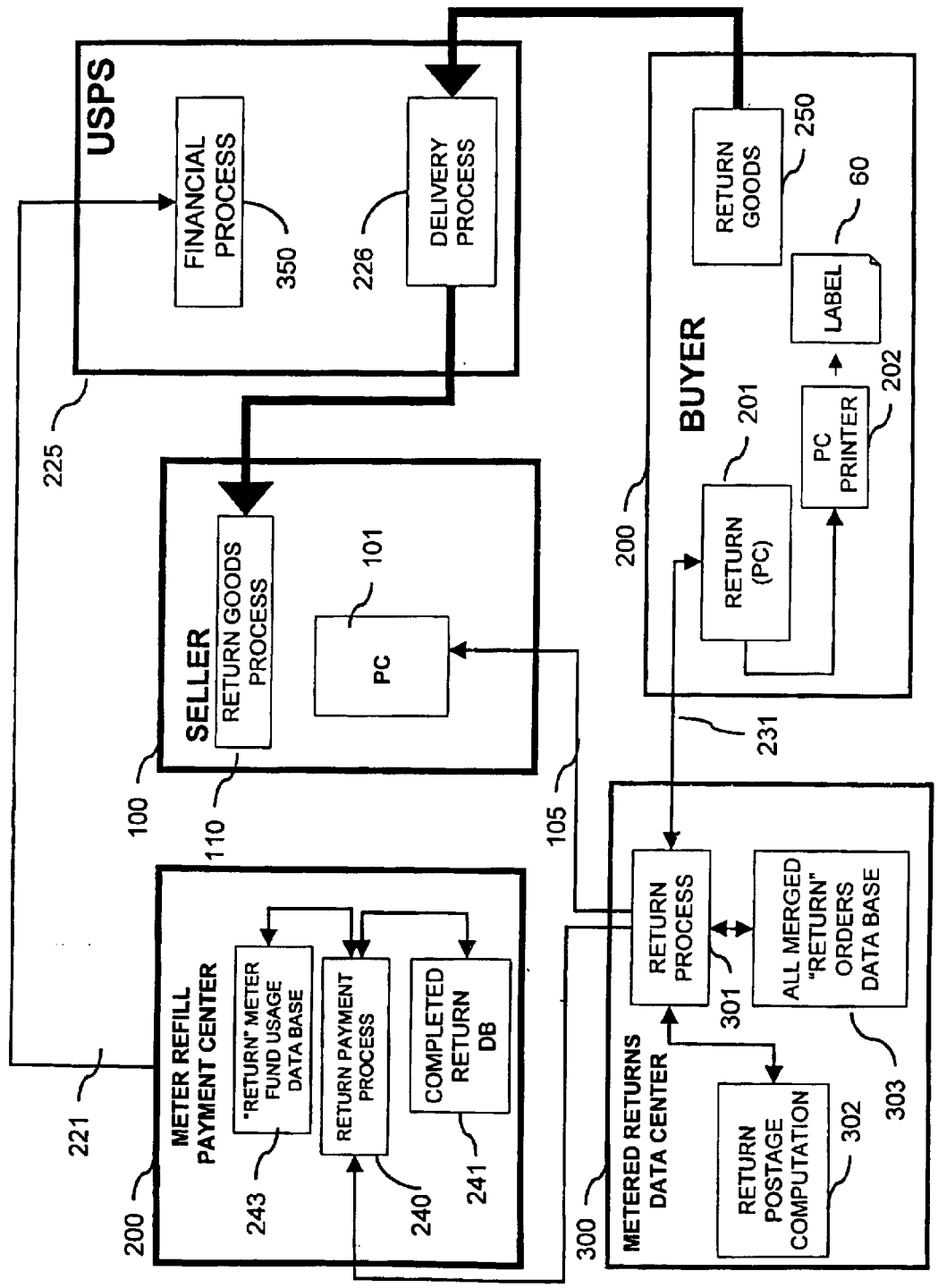
FIG. 5 is a drawing showing the manner in which goods are returned.

FIG. 5 is a drawing showing the manner in which goods are returned. After buyer 200 has examined the goods delivered to receive location 230 (FIG. 4) and determined that the goods are going to be returned to seller 100, buyer computer 201 contacts return process 301 via communications link 231. If seller 100 will accept return of the goods, return process 301 will inform buyer 200 to enter postal meter serial number 58 (FIG. 2) and security code 59 into computer 201 so that the above information will be received by return process 301. Process 301 will inform returns and postage computation 302 to use data base 303 to calculate the postage required to mail the goods back to seller 100 and enter the appropriate information in label 60 (FIGS. 3A and 3B). The above information and postage calculated will be stored in actual returned orders data base 303. Return process 301 will download label 60 to buyer computer 201 via communications link 231. Computer 201 will cause printer 202 to print label 60. Buyer 200 will place label 60 on a container containing the goods that are going to be returned to seller 100 via return 250 and delivery process 226. Delivery process 226 is coupled to return goods process 110 and returned goods process 110 is coupled to computer 100. Seller 100 will receive the goods via delivery process 226 and buyer 200 will receive a refund via returned goods process 110.

Computation 302 informs computer 101 via communications link 105 of the information that will be used to produce label 60. Computation 302 transmits a message to pay process 240. Completed return usage data base 241 is coupled to process 240, and pay used data base 243 is coupled to process 240. Process 240 utilizes data bases 241 and 243 to initiate payment of the funds to the post that are indicated on label 60. During the required data and transfer of funds from meter refill and payment center 209 to carrier 225, financial process 350 will receive the funds that are due the post from the foregoing transactions.

Figure 6A:
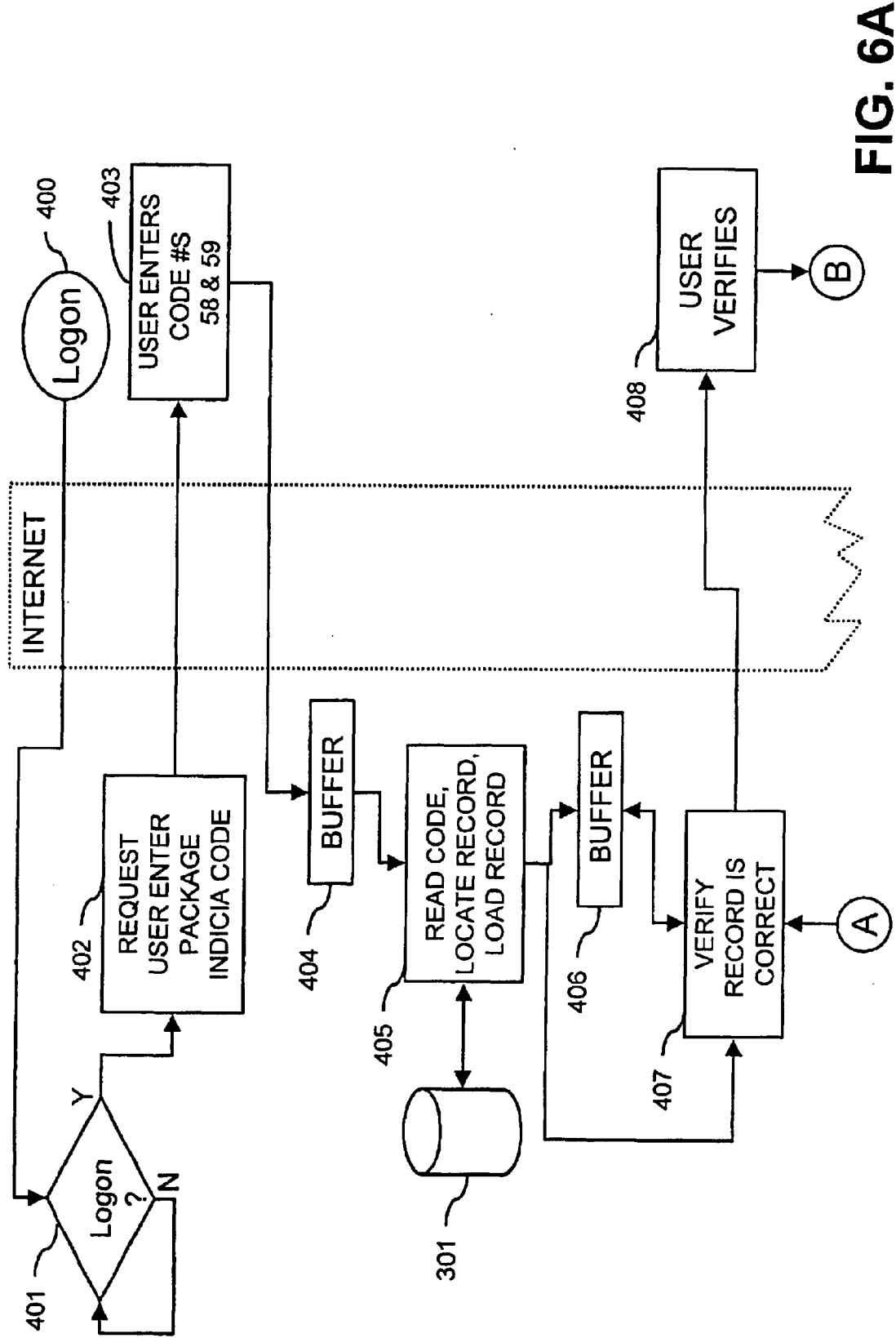
FIGS. 6A–6C is a flow chart showing the computing of return postage, formatting and printing Label 60.
Figure 6B:
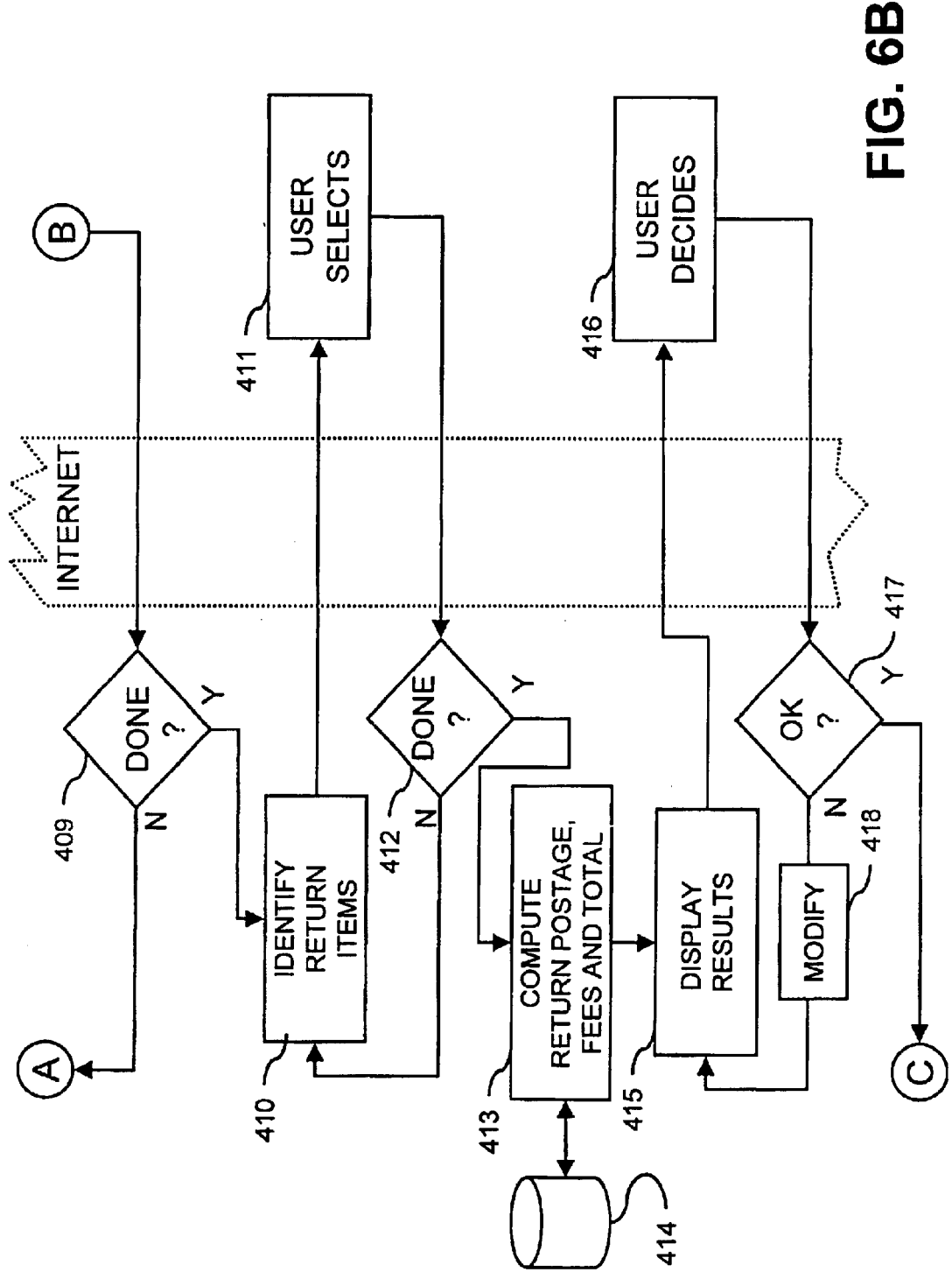
Figure 6C:
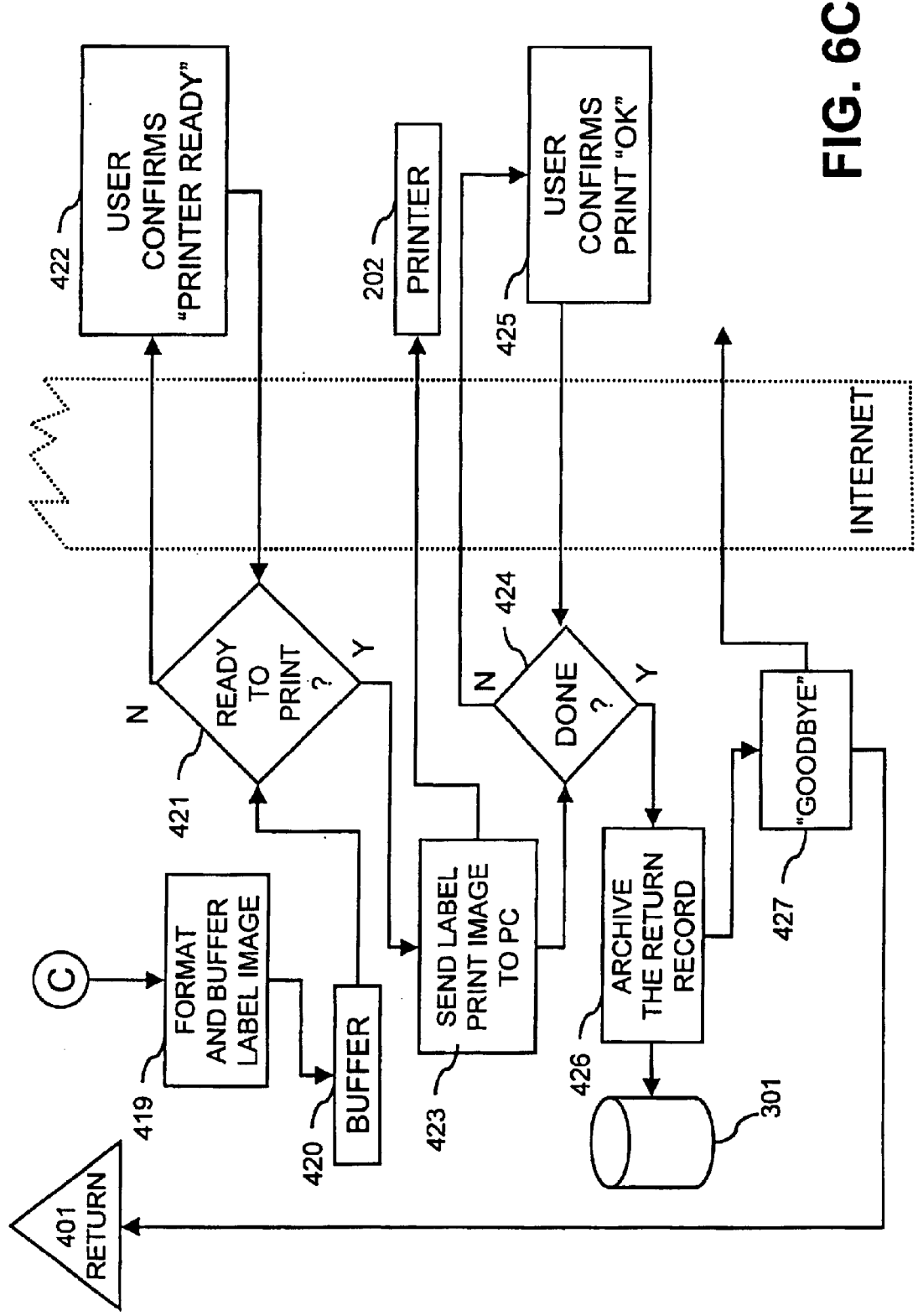

FIGS. 6A–6C is a flow chart showing the computing of return postage, formatting and printing Merchandise Return Label 60. The program starts in block 400 where the buyer logs onto the Metered Returns Data Center 300 (FIG. 5) internet site. Then the program goes to decision block 401. Decision block 401 determines whether or not the buyer has logged onto the Metered Returns Data Center 300 internet site. If the buyer has not logged onto Metered Returns Data Center 300 internet site, the program goes back to block 401. If the buyer has logged onto Metered Returns Data Center 300 internet site, the program goes to block 402 to request the buyer enter code 59 and number 58 from indicia 54 (FIG. 2). Now the program goes to decision block 403 where the buyer enters code 59 and number 58 from indicia 54. Then the program goes to buffer 404 to store code 59 and number 58. In block 405, buffer 404 is read. Then the read record is located in all return orders detailed data base 303. The read record is then sent to block 405 and loaded into buffer 406. Block 407 reads buffer 406 and transmits the read information to block 408 where the buyer verifies the transmitted information, i.e., the buyer confirms his/her name and address, his/her order and the items in his/her order.

Then the program goes to decision block 409 (FIG. 6B) Block 409 determines whether or not the buyer has verified the transmitted information. If block 409 determines that the buyer has not verified the transmitted information, the program goes back to block 407. If block 409 determines that the buyer has verified the transmitted information, the program goes to block 410 to ask the buyer to identify the items the buyer wants to return. Then the program goes to block 411 where the buyer identifies the items that he/she is going to return. Now the program goes to decision block 412. Block 412 determines whether or not the buyer has identified the items he/she wants to return. If block 412 determines that the buyer has not identified the items that he/she is going to return, the program goes back to the input of block 410. If block 412 determines that buyer identified the items that he/she is going to return, the program goes to block 413.

Block 413 computes the return postage, fees and total cost that is due for returning the goods. Block 413 uses the postal rates and postal fees in block 414 as well as the known weight of the returned goods in computing the total postage and fees required to return the goods. Then the program goes to block 415 to display the results of the calculation performed in block 413 to the buyer. Now the program goes to block 416 where the buyer decides if the postage, fees and other label information are correct. The buyer or the seller may be obligated to pay the postage and fees in accordance with an agreement between the buyer and the seller. At this point, the program goes to decision block 417. Block 417 determines whether or not the buyer wants to modify the displayed postage, fees or other label information, i.e., does the buyer want to insure the returned goods, etc. If block 417 determines that the buyer wants to modify the displayed postage, fees or other label information, the program goes to block 418 to enable the buyer to modify the postage, fees or other label information, i.e., by selecting a different type of service or class of service, etc. Then the program goes back to block 415 where the postage, fees or other label information selected by the buyer are displayed to the buyer. If block 417 determines that the buyer does not want to modify the displayed postage, fees and, other label information, the program goes to block 419 (FIG. 6C). Block 419 formats and buffers the information needed to produce label 60. Then the program goes to buffer 420. When buffer 420 is full, the program goes to decision block 421.

Block 421 determines whether or not buyer printer 202 (FIGS. 4 and 5) is ready to print. If block 421 determines that printer 202 is not ready to print, the program goes to block 422 to ask the buyer whether or not printer 202 is ready to print. If the buyer states that printer 202 is ready to print, block 421 will have an output on its "yes" line. Then the program goes to block 423 to transmit the information required to print label 60 to printer 202. Then the program goes to decision block 424. Block 424 determines whether or not printer 202 is finished printing. If block 424 determines that printer 202 is not finished printing, the program goes to block 425 to ask the buyer whether or not printer 202 has finished printing. If the buyer states that printer 202 has finished printing, block 424 will have an output on its "yes" line. Then the program goes to block 426 to archive the record. The record is then stored in all return orders detailed data base 303. Then the program displays "good-bye" to the buyer and returns to the input of block 401.

The above specification describes a new and improved Merchandise Return Label that may be printed on a buyer's computer printer and paid for by the seller's postage meter. It is realized that the above description may indicate to those skilled in the art additional ways in which the principles of this invention may be used without departing from the spirit. Therefore, it is intended that this invention be limited only by the scope of the appended claims.

What is claimed is:

1. A method for a buyer to return goods to a seller, said method includes the steps of:
   A) packing buyer ordered goods in a container addressed to the buyer;
   B) affixing a metered indicia to the container, that identifies the container and its contents, which is charged to a sellers meter account for delivery of the container;
   C) sending information in the indicia, the buyers address, the sellers meter number and container contents to one or more data centers;
   D) delivering the container to the buyer;
   E) notifying a data center of the buyers intention to return all or some of the goods in the container to the seller;
   F) forming at the data center a label having a metered indicia that is charged to the seller's meter account;
   G) delivering the label to the buyers address;
   H) affixing the label to the container or affixing the label to a return container containing the goods the buyer is returning to the seller; and
   I) delivering the container having the returned goods to the seller.

2. The method claimed in claim 1, further including the step of:
   crediting the buyer for the returned goods.

3. The method claimed in claim 1, wherein the label is delivered to the buyer via the internet.

4. The method claimed in claim 1, wherein the label is delivered to the buyer via facsimile.

5. The method claimed in claim 1, wherein the label is delivered to the buyer by expedited mail service.

6. The method claimed in claim 1, further including the step of:
   charging a carrier for the amount debited to the sellers meter at the data center.

7. The method claimed in claim 6, wherein the carrier is the United States Postal Service.

8. The method claimed in claim 6, wherein the carrier is a private delivery service.

9. The method claimed in claim 6, wherein the carrier is a goods pick up service.

10. The method claimed in claim 1, wherein the label includes carrier fees for selected services to deliver the container to the seller.

11. The method claimed in claim 10, wherein the data center calculates the total fees that are due the carrier for the selected services.

12. A method for a buyer to return goods to a seller, said method includes the steps of:
    A) delivering buyer ordered goods in a container addressed to the buyer having a metered indicia affixed to the container, that identifies the container and its contents, which is charged to a sellers meter account for delivery of the container;
    B) sending information in the indicia, the buyers address, the sellers meter number and container contents to one or more data centers;
    C) delivering the container to the buyer;
    D) notifying a data center of the buyer's intention to return all or some of the goods in the container;
    E) forming at the data center a label having a metered indicia that is charged to the seller's meter; and
    F) delivering the container with the labels affixed thereto and containing the returned goods to the seller.

13. The method claimed in claim 12, further including the step of:
    reading the metered indicia to determine whether or not the indicia have been paid for.

* * * * *